United States Patent [19]

Eilers et al.

[11] 3,983,186

[45] Sept. 28, 1976

[54] PROCESS FOR PREPARING RIGID PVC FORMULATIONS

[75] Inventors: Kenneth L. Eilers, Irvington, N.Y.; Adam F. Kopacki, Westwood, N.J.

[73] Assignee: Stauffer Chemical Company, Westport, Conn.

[22] Filed: Aug. 4, 1971

[21] Appl. No.: 169,049

[52] U.S. Cl. .................. 260/876 R; 260/23 XA; 260/28.5 D; 260/45.7 S; 260/42.21; 260/884
[51] Int. Cl.² .......................................... C08L 51/00
[58] Field of Search ............ 260/876, 836, 41, 37, 260/884

[56] References Cited
UNITED STATES PATENTS

| | | | |
|---|---|---|---|
| 2,927,093 | 3/1960 | Germon | 260/876 R |
| 2,943,074 | 6/1960 | Feuer | 260/876 R |
| 3,504,053 | 3/1970 | Williams | 260/876 R |

*Primary Examiner*—J. Ziegler
*Attorney, Agent, or Firm*—Daniel S. Ortiz

[57] ABSTRACT

There is disclosed a low temperature blending process for preparing formulations comprising a polyvinyl chloride resin intimately admixed with a polyacrylate-modified PVC process aid, these formulations being particularly suited for use in various forming processes such as extrusion, calendering and injection molding which result in the manufacture of shaped articles such as pipes, rods, sheets and films whose surfaces are characterized by their high degree of smoothness and glossiness.

24 Claims, No Drawings

PROCESS FOR PREPARING RIGID PVC FORMULATIONS

BACKGROUND OF THE INVENTION

When converting PVC, i.e. polyvinyl chloride, the resin ordinarily undergoes a fluxing step after which it is processed to its desired shape. It is, of course, necessary that the resin remain stable at the high temperatures which are encountered during these processing and fluxing procedures. Additionally, the resin must yield under stress, it must have adequate flow properties and it must lend itself to milling and extrusion. Since unmodified PVC resin does not always possess all of these properties, it has been necessary or desirable to add various process aids to the resin. For instance, acrylic ester polymers in granular form are dry-mixed with the PVC resin and then milled on a calender or extruded. Alternatively, it is suggested by British Pat. Nos. 1,062,308 and 1,015,334 that the vinyl chloride may be polymerized in the presence of the pre-formed acrylic ester polymer or the acrylic ester monomer may be added to the polyvinyl chloride latex and polymerized in situ. The resulting product is an emulsion grade polyvinyl chloride blended with the polyacrylate ester modifier. Such modified polymers and processing aids permit faster calendering with improved gloss, better surface qualities on extrusion, freedom from plating and other benefits.

In copending application Ser. No. 43,568, filed June 4, 1970, the entire disclosure of which is incorporated herein, there is decribed an improved process for preparing a process aid for polyvinyl chloride resins. This novel process aid comprises a polyacrylate-modified PVC, i.e. a polyacrylate-modified polyvinyl chloride, which is prepared by: (1) suspension polymerizing vinyl chloride under conditions whereby polyvinyl chloride is obtained in a certain particle size range by means of a conventional, free radical initiated, suspension polymerization at a controlled rate of agitation and in the presence of a specified concentration of a suspending agent; (2) unreacted vinyl chloride is removed from the system after polymerization is at least 60% complete; (3) there is then added to the system an effective concentration of a chain transfer agent and a minor proportion, i.e. up to about 50% by weight of total solids of an acrylate ester monomer comprising methyl methacrylate and up to about 25% of its weight of one or more optional comonomers, as hereinafter defined, said monomer or monomers having first been pre-mixed with a fresh supply of an effective concentration of a monomer soluble, free radical catalyst; (4) the polymerization is then continued until the thus added methyl methacrylate, and any optional comonomers added therewith, are polymerized in and/or on the particles of the previously polymerized PVC; and, (5) the polyacrylate-modified polyvinyl chloride thereby obtained is then separated from the reaction medium. Apparently, the thus added acrylate ester monomer, i.e. the methyl methacrylate and any optional comonomers, are absorbed by and polymerized in and/or on the initially prepared polyvinyl chloride particles so as to thereby produce particles of a polyacrylate-modified PVC resin which acts as an effective process aid for blending with conventionally prepared polyvinyl chloride resin.

Subsequent to the filing of the above described copending application, it was found that when mixtures of PVC resins with this new polyacrylate-modified PVC process aid were subjected to various forming procedures, such as extrusion, calendering and injection molding, the surfaces of the resulting formed products were often characterized by their dullness and roughness. The latter properties are, of course, highly undesirable since, in order to be commercially acceptable, formed PVC resin products such as pipe, sheeting and film must have surfaces which are both smooth and glossy.

Thus, it is the prime object of this invention to find a means for preparing formed products from blends of a PVC resin and the above described polyacrylate-modified PVC process aid which is capable of yielding these formed products wih surfaces which are exceedingly smooth and glossy. Various other objects and advantages will become apparent during the course of the following disclosure.

TECHNICAL DISCLOSURE OF THE INVENTION

It has now been found that, in order to be able to obtain formed products whose surfaces are smooth and glossy, it is necesary to intimately admix the above described polyacrylate-modified PVC process aid with the PVC resin at relatively low temperatures after the PVC resin has first been combined at higher temperatures with the various other processing adjuncts or ingredients, e.g. stabilizers, lubricants and pigments, etc. with which it is being blended. This low temperature blending procedure is directly contrary to the teachings of the prior art which recommend that process aids be blended with PVC resins at high temperatures. However, the use of this conventional high temperature blending procedure has been found to be directly responsible for the rough, dull surfaces of the products which have been formed from formulations which have been prepared in this manner.

In greater detail, now, the polyacrylate-modified PVC process aid which is utilized in the process of this invention comprises particles of polyvinyl chloride which have polyacrylate ester moieties polymerized therein and/or thereon. These polyacrylate ester moieties may comprise polymethyl methacrylate or, more preferably, copolymers of methyl methacrylate with up to about 20%, by weight, of at least one ethylenically unsaturated, i.e. vinyl comonomer. These polyacrylate ester moieties, which should preferably comprise a methyl methacrylate copolymer, are present in the process aid particles in a concentration of from about 10–60, and preferably about 20–40%, as based on the weight of the polyvinyl chloride moiety of the process aid particles.

The vinyl comonomers which are preferably used, together with methyl methacrylate, in forming the polyacrylate ester moieties of these process aid particles may be selected from the group consisting of the $C_2$–$C_3$ alkyl methacrylates, e.g. ethyl, n-propyl and 2-propyl methacrylate; the glycidyl esters of acrylic and methacrylic acid, e.g. glycidyl methacrylate and glycidyl acrylate; and, preferably the $C_1$–$C_{12}$ alkyl acrylates wherein the alkyl group may be straight or branched e.g. methyl, n-propyl, n-butyl, iso-butyl, tert-butyl, hexyl, 2-ethylhexyl, decyl and dodecyl acrylate; or, mixtures of any two or more of the latter optional monomers. Especially prefered is the polyacrylate-modified PVC process aid wherein the respective particles comprise about 70%, by weight, of polyvinyl chloride and about 30%, by weight, of a polyacrylate ester moiety which comprises about an 86:14 methyl methacrylate:n-butyl acrylate copolymer.

The process of preparing these polyacrylate-modified PVC process aids has been described in the "Background of The Invention" portion of this disclosure. Additional details may be obtained from Example I, hereinbelow, as well as in the above noted copending application.

It is highly desirable that the particle size of the polyacrylate-modified PVC process aid should be within certain limits. Thus, it is preferred that they should range in size from a minimum of about 10 microns up to a maximum limit such that no more than about 15%, by weight, are larger than about 150 microns. A preferred range is from about 40 to 150 microns. Thus, if the particles of the processing aid are substantially smaller than the above stated minimum size, it will be extremely difficult to isolate them with conventional plant equipment. Conversely, if the maximum limit for the size of these processing aid particles is substantially exceeded, gels, "fish-eyes", and an "apple sauce" effect, i.e. a grain-like surface, will be imparted to the shaped particles prepared from PVC compositions containing such oversized process aid particles.

It should also be noted that this polyacrylate-modified PVC process aid should, preferably, have a molecular weight, as expressed in terms of its Relative Viscosity, as determined in a 1% by weight solution of the polymer in cyclohexanone at 25°C., of from about 1.9 – 2.80 and, preferably, from about 2.30 – 2.60. Thus, it has been found that those products having a Relative Viscosity within this range will display optimum melt flow characteristics. As is known to those skilled in the art, Relative Viscosity is calculated by the use of the following formula:

$$\text{Relative Viscosity} = \frac{T_1}{T_2}$$

where $T_1$ = the time required for the passage of a standard volume of the polymer solution through an orifice in a viscometer and $T_2$ = the time required for the passage of a standard volume of the solvent through the orifice in the identical viscometer.

Although these polyacrylate-modified PVC process aids will ordinarily be combined with a polyvinyl chloride resin in carrying out the low temperature blending process of this invention, it should be noted that it is also possible to employ copolymers of vinyl chloride with minor proportions of one or more ethylenically unsaturated, i.e. vinyl, comonomers including alpha-olefins such as ethylene, propylene and butylene; vinyl esters of carboxylic acids such as vinyl acetate, vinyl propionate, vinyl butyrate, and vinyl stearate; $C_1$–$C_{20}$ alkyl esters of acrylic and methacrylic acid such as methyl methacrylate, methyl acrylate, ethyl acrylate, butyl acrylate, 2-ethylhexyl acrylate and lauryl acrylate; aryl, halo- and nitro- substituted benzyl esters of acrylic and methacrylic acid such as benzyl acrylate and 2-chlorobenzyl acrylate; ethylenically unsaturated monocarboxylic acids such as acrylic and methacrylic acids; ethylenically unsaturated dicarboxylic acids, their anhydrides and their $C_1$–$C_{20}$ mono- and dialkyl esters such as aconitric acid, fumaric acid, maleic acid, itaconic acid, citraconic acid, maleic anhydride, dibutyl fumarate and mono-ethyl maleate; amides of ethylenically unsaturated carboxylic acids such as acrylamide and methacrylamide; vinyl aryl compounds such as styrene and alpha-methyl styrene; nitriles of ethylenically unsaturated carboxylic acids such as acrylonitrile and methacrylonitrile; vinyl pyrrolidones such as N-vinyl-2-pyrrolidone; $C_1$–$C_{20}$ alkyl vinyl ethers such as methyl vinyl ether, ethyl vinyl ether and stearyl vinyl ether; dienes such as isoprene and butadiene; and, glycidyl esters of acrylic and methacrylic acid such as glycidyl acrylate and glycidyl methacrylic, etc. Thus, it is to be understood that the use in this disclosure, of the term "PVC resin" or "vinyl chloride resin" is meant to encompass polyvinyl chloride as well as copolymers of vinyl chloride with a minor proportion of at least one ethylenically unsaturated, i.e. vinyl, comonomer.

Coming, now, to the essence of the subject invention involving the details of the process used for the actual blending of a PVC resin with the polyacrylate-modified PVC process aid, this procedure requires the low temperature, intimate admixture of the process aid with the PVC resin after the PVC resin has first been intimately admixed, at higher temperatures, with the various pigments, stabilizers, lubricants and other processing ingredients or adjuncts which will comprise the final formulation. More particularly, this novel low temperature blending process involves first raising the temperature of the PVC resin from room temperature to a temperature in the range of from about 180° to 250°F., preferably about 210° to 230°F., during which time the selected stabilizers, lubricants and pigments are intimately admixed with the resin with the stabilizers ordinarily being added subsequent to the addition of the lubricants. Ordinarily, the temperature of the PVC resin will be raised as a result of the friction which is generated by subjecting it to high speed, mechanical agitation although external heating may also be applied if so desired. The above described processing adjuncts are often introduced at specific temperature levels within the above given range. For example, the stabilizers are usually added at from about 100° to 140°F., the lubricants at from about 175° to 185°F. and the pigments at from about 195° to 210°F.

After all of these different processing adjuncts have been admixed with the PVC resin, the temperature of the resulting mixture is decreased to within the range of from about 70° to 150°F., preferably to about 70° to 105°F. whereupon the polyacrylate-modified PVC process aid is introduced in a concentration of from about 1 to 10, preferably about 1.5 to 7%, by weight, of the PVC resin. The final formulation is then cooled down to room temperature. The decrease in the temperature of the PVC resin formulation is affected by decreasing the rate of agitation to which it is being subjected and/or by the application of external cooling. Thus, it is to be emphasized that mechanical agitation, or stirring, is being applied throughout the entire course of the blending process of this invention.

As will be understood by those skilled in the art, the actual temperatures, within the above stated ranges, at which the process aid and the other adjuncts or processing ingredients are introduced will be largely determined by the composition of the particular PVC resin, process aid, stabilizers, lubricants and pigments and other adjuncts which are being utilized in preparing any given formulation.

The entire blending process is, as previously noted, carried out under agitation and may be conducted in any suitable apparatus capable of applying sufficient mechanical agitation to achieve the degree of heating necessary to yield an intimate admixture of the various ingredients. Thus, suitable devices which may be employed include such high speed, intensive mixers as the Henschel mixer manufactured by the Prodex Division of the Koehring Co. and the Welex Papenmeyer system manufactured by Welex, Inc.

Subsequent to its preparation by means of the low temperature blending process of this invention the dry-blended formulation of the PVC resin, the polyacrylate-modified PVC process aid and any desired processing adjuncts may then be directly converted, by means of an appropriate forming process, into a finished product having any desired shape such, for example, as pipe, rods, tubes, siding, molded solids, bottles and other containers, film and sheeting. Alternatively, the dry-blended mixture may be extruded into rods or sheets which are then comminuted into small, cylindrical or cubical particles commonly referred to as pellets. These pellets, which can be conveniently packed, stored and transported, may then, in turn, be formed into finished products.

The use, in this disclosure of the term "forming process" or "forming" is meant to encompass all of the various mechanical procedures ordinarily utilized in the plastics industry for converting or fabricating PVC resins into useful end products. Such procedures include, for example, extrusion, calendering, injection molding, compression molding, blow molding, fluidized bed coating, electrostatic powder spraying and rotational casting or molding.

In effect, the novel, low temperature blending process of this invention serves to accomplish the complete and uniform distribution, within the PVC resin substrate, of the process aid particles and of the various other processing adjuncts thereby assuring proper processibility of the resulting homogeneous mixture. Thus, in the absence of such a complete and uniform distribution, the resulting mixture will be heterogeneous in composition so that substantial masses of PVC resin will be substantially devoid of the process aid as well as of the stabilizers, lubricants, pigments and other adjuncts. This, of course, is highly undesirable since the PVC resin will not receive the benefits ordinarily derived from the presence of the process aid and the various adjuncts. For example, in the absence of stabilizers, the PVC resin may fuse at high temperatures thereby yielding discolored spots or streaks.

Typical lubricants which may be included in these formulations together with the PVC resin and the polyacrylate-modified PVC process aid include stearic acid and its barium, calcium and lead, salts, petroleum or paraffin based waxes, oils, low molecular weight polyethylene waxes, stearamides, montan wax, modified montan wax, synthetic waxes and stearic acid esters such as glyceryl monostearate. These lubricants are usually employed in a concentration of from about 0.1 to 3%, by weight, of the PVC resin.

Suitable pigments for use in these formulations include calcium carbonates, titanium dioxide, whiting, carbon black or any of the other pigments normally used in the processing of plastics. Such pigments are usually employed in a concentration of from about 0.1 to 30%, by weight, of the PVC resin.

The stabilizers which can be included in these formulations are substances which will protect the final formed product from the degradative effects of heat and light. Such substances include phenyl salicylates; benzophenones; benzotriazoles; basic lead compounds such as dibasic lead phosphate, dibasic lead stearate, lead sulfate, lead chlorosilicate and dibasic lead phthalate; organo tin compounds such as dibutyl tin maleate, dibutyltin dilaurate, di(n-octyl) tin maleate polymer, n-butyl stannoic acid, thiollauric acids or its anhydride, dibutyltin lauryl mercaptide, dibutyltin isoctyl thioglycollate, dibutyltin mercaptopropionate and di(n-octyl) tin S,S'bis(isooctylmercaptoacetate); organic acid salts of barium, cadmium calcium or zinc such as barium 2-ethylhexoate, barium nonylphenate, cadmium 2-ethylhexoate, zinc 2-ethylhexoate and the laurates and stearates of barium, cadmium, calcuim or zinc; polyols such as pentaerythritol and sorbital; nitrogen compounds such as melamine, benzoguanamine and dicyandiamide; epoxies such as epoxidized soya oil, epoxidized linseed oil, epoxidized tall oil esters and butyl and octyl epoxy stearate; organic phosphites such as diphenyldecyl phosphite, phenyl didecyl phosphite and trisnonylphenyl phosphite; and, liquid phenolics such as butylated hydroxytoluene. These stabilizers are usually employed in a concentration of from about 0.5 to 5%, by weight, of the PVC resin. For a more complete listing of pigments, lubricants, stabilizers and other functional additives, one may consult "Polyvinyl Chloride" by H. A. Sarvetnick published by Van Nostrand Reinhold Co., New York, New York, in 1969.

As has previously been noted, when the mixtures of PVC and the polyacrylate-modified PVC process aid which are obtained from the low temperature blending process of this invention are subjected to a forming process, the resulting shaped products will have surfaces which are characterized by their excellent gloss and smoothness. This is in contrast to the poor gloss and roughness displayed by the shaped objects derived from formulations in which the identical process aid and PVC resin have been blended at high temperatures. Thus, the formulations of this invention may be successfully utilized in any type of forming process to produce such products as pipes, rods, sheets, tubes, profiles, films and cable coatings all of which will have surfaces displaying excellent gloss and smoothness.

The following examples are given to illustrate this invention but not in any way to limit its scope. In these examples, all parts given are by weight unless otherwise noted.

EXAMPLE I

This example illustrates the preparation of a typical polyacrylate-modified PVC process aid for use in the low temperature blending process of this invention.

Part 1

A 20 gallon Pfaudler reactor is charged with a standard recipe, as given below, for preparing suspension grade polyvinyl chloride. The polymerization is conducted at 60°C. for 5½ hours, with agitation being applied at a rate of about 300 rpm., resulting in the preparation of PVC particles having an average particle size of about 25–30 microns:

|  | Parts |
|---|---|
| Vinyl chloride | 221 |
| Water | 234 |
| Methyl cellulose | 50 (1% aqueous solution) |
| 2,2'-azobisisobutyronitrile | 0.144 |

| (Catalyst) | Parts |
|---|---|

Part 2

When the reaction of Part 1, hereinabove, is essentially complete, i.e. about 80–85% conversion, all of the excess vinyl chloride monomer is vented off whereupon 0.027 parts of lauryl mercaptan chain transfer agent followed by a mixture of 77.4 parts of methyl methacrylate, i.e. MMA, and 12.6 parts of n-butyl acrylate, which has first been pre-mixed with 0.063 parts of additional 2,2′-azobisisobutyronitrile catalyst, are added. Under agitation at a rate of 300 rpm., the polymerization is allowed to proceed for about 5 hours at 75°C. until the MMA is polymerized in and/or on the host PVC particles. The resulting product which comprises about 70%, by weight, of PVC and about 30%, by weight, of a polyacrylate moiety comprising about an 86:14 methyl methacrylate:n-buthl acrylate copolymer, has a Relative Viscosity as determined under the conditions described hereinabove, of about 2.50. The particle size of this polyacrylate-modified PVC process aid is such that no more than about 10.1%, by weight, is larger than about 150 microns.

EXAMPLE II

This example illustrates the use of the novel, low temperature blending process of this invention in preparing a mixture of a PVC resin with a polyacrylate-modified PVC process aid. It also provides a comparison between the properties of a product which is extruded from this formulation and the properties of a product extruded from a PVC resin-process aid formulation which is prepared by the addition, in this instance at high temperatures, of the identical polyacrylate-modified PVC process aid to a sample of the identical PVC resin.

Part 1

In preparing a mixture of a PVC process aid according to the process of this invention, 100 parts of suspension grade polyvinyl chloride resin granules are introduced into a Welex high speed, intensive mixer whose impeller speed is gradually increased up to 3,000 rpm. which results in a temperature rise of about 3°–6°F. per minute within the resin mass. When the temperature of the resin is at about 140°F., 2.0 parts of an organo tin mercaptide stabilizer sold as "Thermolite 31" by M & T Chemicals, Inc. are added to the resin. Under continued agitation, the temperature of the mixture is raised to about 170°–175°F. at which point 2.0 parts of calcium stearate and 0.1 parts of a low molecular weight polyethylene wax, sold by The Allied Chemical Co. as "PE-629 A" are added. Next, the temperature of the mixture is allowed to rise to about 215°F. whereupon 1.0 part of titanium dioxide is added. Upon reducing the rate of agitation and applying external cooling, the temperature of the mixture is reduced to about 100°F. at which point 1.0 part of the process aid particles whose preparation is described in Example I, hereinabove, are introduced. The resulting mixture is then blended, for 10 minutes, at a low rate of agitation and with external cooling whereupon it is removed from the mixer. It is then extruded in a one inch extruder fitted with a multiple hole rod die with the extruder operating at 10–60 rpm. at a stock temperature of about 390°–400°F. The result of this extrusion operation is a plurality of rod shaped products having a circular cross section with a diameter of 1/16 of an inch. Upon examining these rods, their surface is found to be exceedingly smooth and glossy.

Part 2

As a control, the same amounts of the identical ingredients described hereinabove are combined with one another by means of a procedure which is essentially identical to that described in Part 1 with the critical exception, in this instance, that the process aid particles are blended with the mixture of the PVC resin granules and the other stated adjuncts while the latter mixture is at a temperature of about 200°F. Upon examining the extruded rods derived from this formulation, it is found that their surfaces are very rough to the touch as well as being dull and lacking in gloss.

Similar results are obtained when comparisons are made between the surface properties of rods derived from formulations prepared, respectively, by means of the low temperature blending procedure of this invention and the blending procedure of Part 2, hereinabove, in which the process aid is added while the resin is at a high temperature of about 200°F. in which the following polyacrylate-modified process aids are utilized:

1. a 66:34 PVC:polyacrylate material having a Relative Viscosity of about 2.62 in which the polyacrylate moiety is 100% polymethyl methacrylate, and
2. a 68.8:31.2 PVC:polyacrylate material having a Relative Viscosity of about 2.79 in which the polyacrylate moiety is a 90:10 methyl methacrylate:ethyl acrylate copolymer.

Variations may be made in proportions, procedures and materials without departing from the scope of the subject invention as defined in the following claims.

What is claimed is:

1. In the process of forming shaped objects from a formulation comprising an intimate admixture of a vinyl chloride resin and a plurality of particles of a polyacrylate-modified polyvinyl chloride process aid, the improvement which comprises intimately admixing said process aid particles with said vinyl chloride resin at a temperature in the range of from about 70° to 150°F. after first raising the temperature of said vinyl chloride resin to within the range of from about 180° to 250°F. by subjecting it to mechanical agitation; the particles of said polyacrylate-modified polyvinyl chloride process aid comprising particles of polyvinyl chloride having polyacrylate ester moieties polymerized in and/or on said particles, said polyacrylate ester moieties being selected from the group consisting of polymethyl methacrylate and copolymers of methyl methacrylate with up to about 20%, by weight, of at least one ethylenically unsaturated comonomer; said polyacrylate ester moieties being present in a concentration of from about 10 to 60% as based on the weight of the polyvinyl chloride moieties of said particles.

2. The process of claim 1, wherein said process aid particles are intimately admixed with said vinyl chloride resin at a temperature in the range of from about 70° to 105°F.

3. The process of claim 1, wherein the temperature of said vinyl chloride resin has first been raised to within the range of from about 210° to 230°F. prior to being intimately admixed with said process aid particles.

4. The process of claim 1, wherein said vinyl chloride resin is polyvinyl chloride.

5. The process of claim 1, wherein said vinyl chloride resin is a copolymer of vinyl chloride and a minor proportion of at least one ethylenically unsaturated comonomer.

6. The process of claim 1, wherein the polyacrylate ester moieties of said process aid particles comprise polymethyl methacrylate.

7. The process of claim 1, wherein the polyacrylate ester moieties of said process aid particles comprise copolymers of methyl methacrylate with up to 20%, by weight, of at least one ethylenically unsaturated comonomer selected from the group consisting of the $C_2$–$C_3$ alkyl methacrylates, the $C_1$–$C_{12}$ alkyl acrylates, the glycidyl esters of acrylic and methacrylic acid and mixtures thereof.

8. The process of claim 7, wherein said ethylenically unsaturated comonomer is a $C_1$–$C_{12}$ alkyl acrylate.

9. The process of claim 8, wherein said ethylenically unsaturated comonomer is n-butyl acrylate.

10. The process of claim 1, wherein said process aid particles comprise about 70%, by weight, of polyvinyl chloride and about 30%, by weight, of polyacrylate ester moieties which comprise about an 86:14 methacrylate-n-butyl acrylate copolymer.

11. The process of claim 1, wherein said vinyl chloride resin is intimately admixed with at least one processing adjunct selected from the group consisting of lubricants, stabilizers and pigments prior to its intimate admixture with said polyacrylate-modified polyvinyl chloride process aid.

12. The process of claim 1, wherein said process aid particles are admixed with said vinyl chloride resin in a concentration of from about 1–10%, as based on the weight of said vinyl chloride resin.

13. The process of preparing a formulation comprising an intimate admixture of a vinyl chloride resin and a plurality of particles of a polyacrylate-modified polyvinyl chloride process aid, said formulation being especially suited for forming shaped objects whose surfaces are characterized by their high degree of smoothness and gloss, said process comprising first raising the temperature of said vinyl chloride resin to within the range of from about 180° to 250°F. by subjecting it to mechanical agitation, lowering the temperature of said resin to within the range of from about 70° to 150°F. and then intimately admixing said process aid particles with said resin; the particles of said polyacrylate-modified polyvinyl chloride process aid comprising particles of polyvinyl chloride having polyacrylate ester moieties polymerized in and/or on said particles, said polyacrylate ester moieties being selected from the group consisting of polymethyl methacrylate and copolymers of methyl methacrylate with up to about 20%, by weight, of at least one ethylenically unsaturated comonomer; said polyacrylate ester moieties being present in a concentration of from about 10 to 60% as based on the weight of the polyvinyl chloride moieties of said particles.

14. The process of claim 13, wherein said process aid particles are intimately admixed with said vinyl chloride resin at a temperature in the range of from about 70° to 105°F.

15. The process of claim 13, wherein the temperature of said vinyl chloride resin has first been raised to a temperature in the range of from about 210° to 230°F. prior to being intimately admixed with said process aid particles.

16. The process of claim 13, wherein said vinyl chloride resin is polyvinyl chloride.

17. The process of claim 13, wherein said vinyl chloride resin is a copolymer of vinyl chloride and a minor proportion of at least one ethylenically unsaturated comonomer.

18. The process of claim 13, wherein the polyacrylate ester moieties of said process aid particles comprise polymethyl methacrylate.

19. The process of claim 13, wherein the polyacrylate ester moieties of said process aid particles comprise copolymers of methyl methacrylate with up to 20%, by weight, of at least one ethylenically unsaturated comonomer selected from the group consisting of the $C_2$–$C_3$ alkyl methacrylates, the $C_1$–$C_{12}$ alkyl acrylates, the glycidyl esters of acrylic and methacrylic acid and mixtures thereof.

20. The process of claim 19, wherein said ethylenically unsaturated comonomer is a $C_2$–$C_{12}$ alkyl acrylate.

21. The process of claim 20, wherein said ethylenically unsaturated comonomer is n-butyl acrylate.

22. The process of claim 13, wherein said process aid particles comprise about 70%, by weight, of polyvinyl chloride and about 30%, by weight, of polyacrylate ester moieties which comprise about an 86:14 methyl methacrylate:n-butyl acrylate copolymer.

23. The process of claim 13, wherein said vinyl chloride resin is intimately admixed with at least one processing adjunct selected from the group consisting of lubricants, stabilizers and pigments prior to its intimate admixture with said polyacrylate-modified polyvinyl chloride process aid.

24. The process of claim 13, wherein said process aid particles are admixed with said vinyl chloride resin in a concentration of from about 1–10%, as based on the weight of said vinyl chloride resin.

* * * * *

UNITED STATES PATENT AND TRADEMARK OFFICE
CERTIFICATE OF CORRECTION

PATENT NO. : 3,983,186
DATED : September 28, 1976
INVENTOR(S) : Kenneth L. Eilers et al.

It is certified that error appears in the above-identified patent and that said Letters Patent are hereby corrected as shown below:

Col. 1, line 32, "decribed" should be --described--;
Col. 2, line 15, "wih" should be --with--;
Col. 3, line 66, "aconitric" should be --aconitic--;
Col. 7, line 23, "n-buthl" should be --n-butyl--'
In the claims: Claim 10, Col. 9, line 25, "86:14 methacrylate-n-butyl" should be --86:14 methyl methacrylate:n-butyl--.

Signed and Sealed this second Day of August 1977

[SEAL]

Attest:

RUTH C. MASON
Attesting Officer

C. MARSHALL DANN
Commissioner of Patents and Trademarks